L. R. DYE.
Carriage Axle Box.

No. 107,170.  Patented Sept. 6, 1870.

WITNESSES.
Albert H. Norris.
E. W. B. Phillips.

L. R. Dye
By his atty.
Howson & Son.

United States Patent Office.

LEWIS R. DYE, OF CRANBERRY, NEW JERSEY.

Letters Patent No. 107,170, dated September 6, 1870.

IMPROVED AXLE-BOX FOR CARRIAGES.

The Schedule referred to in these Letters Patent and making part of the same.

I, LEWIS R. DYE, of Cranberry, county of Middlesex, State of New Jersey, have invented an Improved Axle-Box, of which the following is a specification.

Nature and Object of the Invention.

My invention consists of certain improvements in axle-boxes, fully described hereafter, whereby the box may be cylindrical in shape externally, and thus adapted to a cylindrical opening in the hub of a wheel without the depth of the internal oil-chamber being reduced, a more uniform bearing of the box on the journal being also obtained, and excessive friction avoided.

Description of the Accompanying Drawing.

Figure 1:
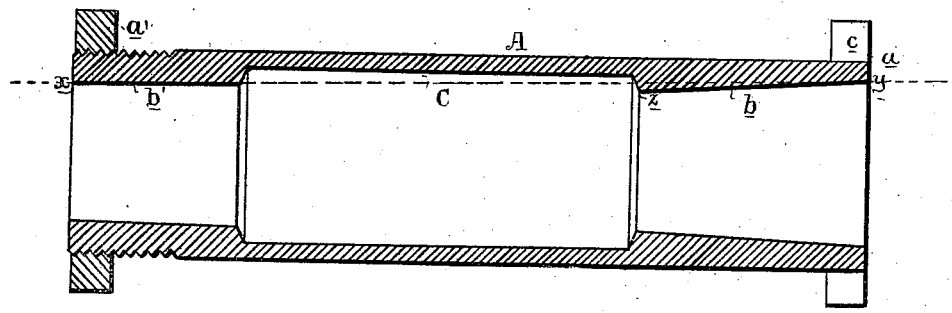
Figure 2:
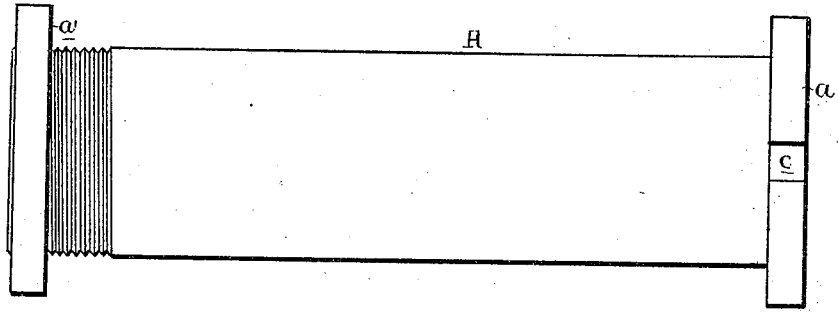

Figure 1 is a longitudinal section of my improved axle-box;
Figure 2, an exterior view; and
Figure 3, a view, partly in section, of a box of an ordinary form.

General Description.

The box A is of cast metal, cylindrical in form and free from any projections or protuberances externally, having at the inner end a flange, $a$, in which are recesses $c$, and at the other end external screw-threads, adapted to those of an annular nut, $a'$.

The interior of the box is bored out to form a central oil-chamber, C, and two bearings, $b\ b'$, near the opposite ends of the box, both bearings being tapering, but the bearing $b$ tapering to a greater extent than the bearing $b'$, its inner edge $z$ being considerably within a line, $x$–$y$, coinciding with the face of the bearing $b'$, and drawn through the outer edges of both bearings.

Figure 3:
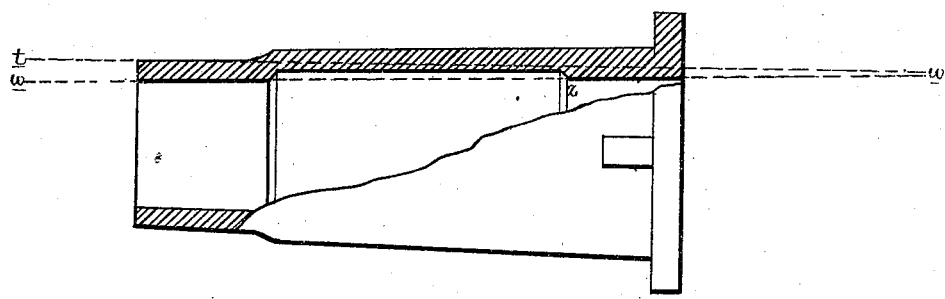

In ordinary boxes, fig. 3, the faces of both bearings coincide with the same line, $w$–$w$, so that, in order to form an oil-chamber, C, of sufficient depth, it is necessary to enlarge the box near its inner end, for it will be seen that, if the box were cylindrical, its outer face coinciding with the line $t$–$w$, the metal at the point $z$ would be so reduced in thickness as greatly to impair the strength of the box.

By imparting a greater amount of taper to the bearing $b$, its inner edge $z$ is carried so far from the external face of the box, that a chamber, C, of ample depth, may be formed, without impairing the strength of a cylindrical box, while the abrupt bearing $b$ may be brought closely against a corresponding conical enlargement on the journal, so as to prevent all play of the box on the journal without danger of wedging it onto the same, or against the usual collar, so tightly as to produce excessive friction.

Owing to the cylindrical form of the box, it may be fitted to a cylindrical opening in the hub, the nice fitting requisite when the box is not uniform in diameter externally being avoided, it only being necessary to enlarge the ends of the opening to receive the flange $a$ and nut $a'$.

The nut $a'$ may in some instances be dispensed with, as, owing to the external screw and to the absence of all lugs or projections on the exterior of the box, the latter can be screwed into the hub and then secured by pins driven into the hub through the recesses $c$.

Claim.

The axle-box A, cylindrical in form externally, and containing a chamber, C, and two tapering bearings, $b\ b'$, when the face of the former is tapered to a greater degree than that of the latter, as and for the purpose set forth.

In testimony whereof I have signed my name to this specification in the presence of two subscribing witnesses.

LEWIS R. DYE.

Witnesses:
 LOUIS BOSWELL,
 WM. A. STEEL.